US012764726B2

(12) United States Patent
Kim et al.

(10) Patent No.: US 12,764,726 B2
(45) Date of Patent: Oct. 13, 2026

(54) APPARATUS AND METHOD OF WIRELESS COMMUNICATION

(71) Applicant: Samsung Electronics Co., Ltd., Suwon-si (KR)

(72) Inventors: Jinmin Kim, Suwon-si (KR); Jungwoon Lee, Suwon-si (KR); Sunghwan Hyun, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 217 days.

(21) Appl. No.: 18/411,641

(22) Filed: Jan. 12, 2024

(65) Prior Publication Data

US 2024/0244601 A1 Jul. 18, 2024

(30) Foreign Application Priority Data

Jan. 17, 2023 (KR) ........................ 10-2023-0006530

(51) Int. Cl.

*H04W 28/02* (2009.01)
*H04W 72/0453* (2023.01)
*H04W 72/542* (2023.01)

(52) U.S. Cl.

CPC ..... *H04W 72/0453* (2013.01); *H04W 72/542* (2023.01)

(58) Field of Classification Search

CPC ..... H04L 5/0048; H04L 5/007; H04L 5/0051; H04L 5/0012; H04W 72/0453; H04W 72/542; H04B 7/01

See application file for complete search history.

(56) References Cited

U.S. PATENT DOCUMENTS

| | | | |
|---|---|---|---|
| 11,463,178 B2 | 10/2022 | Yu et al. | |
| 2015/0009894 A1 | 1/2015 | Vermani et al. | |
| 2016/0156750 A1* | 6/2016 | Zhang | H04L 69/22 370/338 |
| 2017/0366329 A1 | 12/2017 | Cao et al. | |
| 2019/0199491 A1 | 6/2019 | Verma et al. | |
| 2022/0006601 A1 | 1/2022 | Zhu | |
| 2022/0116181 A1 | 4/2022 | Lin | |
| 2023/0268957 A1* | 8/2023 | Sgraja | H04B 7/01 455/67.16 |

FOREIGN PATENT DOCUMENTS

| | | |
|---|---|---|
| JP | 5541500 B2 | 7/2014 |
| KR | 10-2006-0068422 A | 6/2006 |
| KR | 10-2009-0061234 A | 6/2009 |
| KR | 101419808 B1 | 7/2014 |

* cited by examiner

*Primary Examiner* — Phuoc H Doan

(74) *Attorney, Agent, or Firm* — Harness, Dickey & Pierce, P.L.C.

(57) ABSTRACT

A method of wireless communication includes dividing a signal received through an antenna into a plurality of sub-band signals, selecting candidate sub-band signals from among the plurality of sub-band signals, the candidate sub-band signals having a correlation value exceeding a first threshold value, and acquiring preamble information of a physical layer protocol data unit (PPDU) based on a subset of the candidate sub-band signals having a signal-to-noise ratio (SNR) value higher than an SNR threshold value, the SNR threshold value being obtained by subtracting a difference value from a maximum SNR value.

19 Claims, 12 Drawing Sheets

APPARATUS AND METHOD OF WIRELESS COMMUNICATION

CROSS-REFERENCE TO RELATED APPLICATION(S)

This application claims benefit of priority to Korean Patent Application No. 10-2023-0006530 filed on Jan. 17, 2023 in the Korean Intellectual Property Office, the disclosure of which is incorporated herein by reference in its entirety.

BACKGROUND

The present inventive concepts relate to an apparatus and method of wireless communication.

As an example of wireless communication, wireless local area network (WLAN) technology may be technology for connecting two or more devices to each other using a wireless signal transmission method. The WLAN technology may be based on the institute of electrical and electronics engineers (IEEE) 802.11 standard. The 802.11 standard has evolved into 802.11b, 802.11a, 802.11g, 802.11n, 802.11ac, 802.11ax, and the like, and may support transmission rates of up to 1 Gbyte/s based on orthogonal frequency-division multiplexing (OFDM) technology.

In 802.11ac, data may be simultaneously (or contemporaneously) transmitted to multiple users by a multi-user multi-input multi-output (MU-MIMO) technique. In 802.11ax, which is referred to as high efficiency (HE), multiple access may be implemented by applying orthogonal frequency-division multiple access (OFDMA) technology as well as the MU-MIMO technique to divide and provide usable sub-carriers to users. Through this, a WLAN system to which 802.11ax is applied may effectively support communication in densely populated areas and outdoors.

In 802.11be, which is referred to as extremely-high-throughput (EHT), support for a 6 GHz unlicensed frequency band, utilization of up to 320 MHz of bandwidth per channel, introduction of hybrid-automatic-repeat-and-request (HARQ), support for up to 16×16 MIMO, or the like may be intended to be implemented. Through this, the next-generation WLAN system may be expected to effectively support low latency and high-speed transmissions like NR (new radio), which is a 5G technology.

SUMMARY

An aspect of the present inventive concepts is to provide a receiver and a method of wireless communication, capable of accurately determining a valid sub-band including a physical layer protocol data unit (PPDU) in a system band having a plurality of sub-bands.

An aspect of the present inventive concepts is to provide a receiver and a method of wireless communication, capable of accurately decoding a preamble of a PPDU received in one or more sub-bands, and consequently improving the processing performance of a payload.

According to an aspect of the present inventive concepts, a method of wireless communication includes dividing a signal received through an antenna into a plurality of sub-band signals, selecting candidate sub-band signals from among the plurality of sub-band signals, the candidate sub-band signals having a correlation value exceeding a first threshold value, and acquiring preamble information of a physical layer protocol data unit (PPDU) based on a subset of the candidate sub-band signals having a signal-to-noise ratio (SNR) value higher than an SNR threshold value, the SNR threshold value being obtained by subtracting a difference value from a maximum SNR value.

According to an aspect of the present inventive concepts, a method of wireless communication includes dividing a signal received in a system band into a plurality of sub-band signals, selecting candidate sub-band signals based on correlations of the plurality of sub-band signals in a time domain, and acquiring preamble information of a physical layer protocol data unit (PPDU) based on a first valid signal among the candidate sub-band signals, the first valid signal having a first signal-to-noise ratio (SNR) value higher than an SNR threshold value, the first SNR value being calculated based on first sub-carriers among a plurality of sub-carriers of signals in a field, the first sub-carriers including valid symbols, and the SNR threshold value being based on a maximum SNR value.

According to an aspect of the present inventive concepts, an apparatus of wireless communication includes processing circuitry configured to determine candidate sub-band signals from among a plurality of sub-band signals included in a system band based on a training field being detected in the candidate sub-band signals, determine a first valid signal from among the candidate sub-band signals, the first valid signal having a signal-to-noise ratio (SNR) value within a difference value from a maximum SNR value, the maximum SNR value being highest among SNR values of the candidate sub-band signals, the SNR values of the candidate sub-band signals being calculated by using repeated signal patterns in a time domain of a legacy-long training field (L-LTF) of the candidate sub-band signals, decode a preamble of a physical layer protocol data unit (PPDU) to obtain a decoded preamble, the preamble being acquired by combining the first valid signal with a second valid signal from among the candidate sub-band signals when the second valid signal is determined to have an SNR value within the difference value from the maximum SNR value, and decode a payload of the PPDU based on the decoded preamble.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Hereinafter, embodiments of the present inventive concepts will be described with reference to the accompanying drawings.

Figure 1:
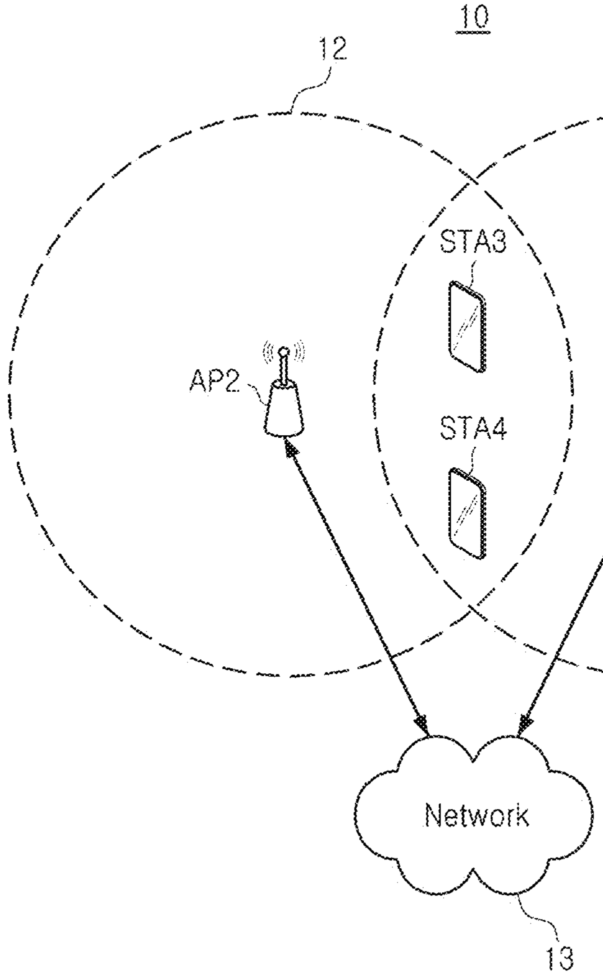
FIG. 1 is a view illustrating a wireless communication system according to embodiments.

FIG. 1 is a view illustrating a wireless communication system according to embodiments. Specifically, FIG. 1 illustrates a wireless local area network (WLAN) system as an example of a wireless communication system 10.

In specifically describing embodiments, OFDM-based or OFDMA-based wireless communication systems, in particular, IEEE 802.11 standards, will be mainly discussed, but embodiments may include other communication systems having similar technical backgrounds and channel types (e.g., a cellular communication system, such as long term evolution (LTE), LTE-advanced (LTE-A), new radio (NR), wireless broadband (WiBro), global system for mobile communication (GSM), and/or a short-distance communication system such as Bluetooth and/or near field communication (NFC)) may also be applied to the extent that such implementations using other communication systems do not deviate significantly from the scope of embodiments, which will be possible at the discretion of a person with skilled technical knowledge in the technical field of this disclosure.

Referring to FIG. 1, a wireless communication system 10 may include first and second access points AP1 and AP2, a first station STA1, a second station STA2, a third station STA3, and/or a fourth station STA4. The first and second access points AP1 and AP2 may access a network 13 including an internet, an internet protocol (IP) network, or any other network. The first access points AP1 may provide the first to fourth stations STA1 to STA4 with access to the network 13 in a first coverage region 11, and the second access point AP2 may also provide the third and fourth stations STA3 and STA4 with access to the network 13 in a second coverage region 12. In embodiments, the first and second access points AP1 and AP2 may communicate with at least one station among the first to fourth stations STA1 to STA4, based on wireless fidelity (Wi-Fi) technology or any other WLAN access technology.

The access points may each be referred to as a router, a gateway, and the like, and the stations may each be referred to as a mobile station, a subscriber station, a terminal, a mobile terminal, a wireless terminal, user equipment, a user, or the like. The station may be a mobile device such as a mobile phone, a laptop computer, a wearable device, or the like, or may be a stationary device such as a desktop computer, a smart TV, or the like.

A transmitting side of the wireless communication system 10 (e.g., one among the first access point AP1, the second access point AP2, the first station STA1, the second station STA2, the third station STA3 or the fourth station STA4) may transmit information through a plurality of sub-bands included in a system band allocated to the wireless communication system 10, for example, a basic service set (BSS) band. Specifically, the transmitting side may transmit a data block called a physical layer protocol data unit (PPDU) by using at least some sub-bands among the plurality of sub-bands.

A preamble of the PPDU may include information used to process the PPDU. Therefore, the information included in the preamble should be accurately transferred to a receiving side (e.g., another one among the first access points AP1, the second access point AP2, the first station STA1, the second station STA2, the third station STA3 or the fourth station STA4, different from the transmitting side) to enable access to the information. When transmitting the PPDU through the sub-bands, the transmitting side may overlap a preamble signal having the same information (or similar information) on each of the allocated sub-bands in order to accurately transfer the information included in the preamble, and may transmit the overlapped signal. The receiving side may detect sub-bands including the PPDU, among the plurality of sub-bands included in the system band, and may combine preamble signals included in each of the detected sub-bands in a frequency domain, to acquire a preamble signal having an improved signal-to-noise ratio (SNR). In order for the receiving side to acquire the preamble signal having the improved SNR, the sub-bands including the PPDU should be accurately detected from among the plurality of sub-bands.

According to embodiments, the receiving side of the wireless communication system 10 may separate a signal received in the system band into a plurality of sub-band signals, and may determine candidate sub-band signals based on a correlation between the plurality of sub-band signals. The receiving side may calculate SNR values of the candidate sub-band signals, and may detect the sub-bands including the PPDU, based on a threshold value determined based on a maximum (or highest) value, among the SNR values. According to embodiments, as the maximum SNR value as discussed herein may refer to a highest SNR value.

According to embodiments, the receiving side may accurately detect the sub-bands including the PPDU, to acquire the preamble signal having an improved SNR, and may quickly and accurately process a payload of the PPDU based on the preamble signal.

Hereinafter, a wireless communication system and a method of wireless communication according to embodiments will be described in detail with reference to FIGS. 2 to 12.

Figure 2:
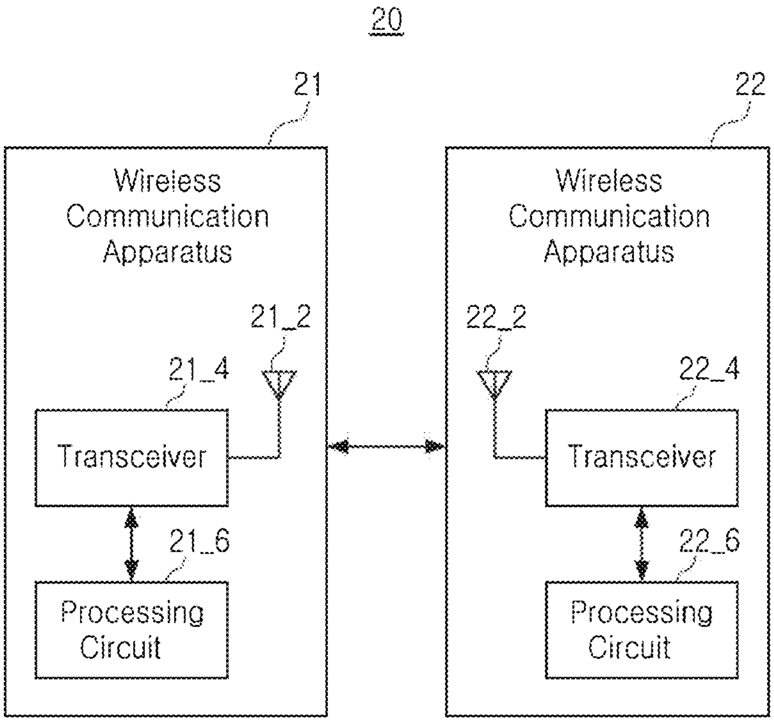
FIG. 2 is a block diagram illustrating a wireless communication system according to embodiments.

FIG. 2 is a block diagram illustrating a wireless communication system according to embodiments. Specifically, the block diagram of FIG. 2 illustrates a first wireless communication apparatus 21 and a second wireless communication apparatus 22, communicating with each other, in a wireless communication system 20. Each of the first wireless communication apparatus 21 and the second wireless communication apparatus 22 of FIG. 2 may be any apparatus that communicates in the wireless communication system 20, and may be referred to as an apparatus of wireless communication. In embodiments, each of the first wireless communication apparatus 21 and the second wireless communication apparatus 22 may be an access point or a station in a WLAN system. According to embodiments, the wireless communication system 20 may be the same as or similar to the wireless communication system 10, and each of the first wireless communication apparatus 21 and the second wireless communication apparatus 22 of FIG. 2 may be any apparatus that communicates in the wireless communication system 10 (e.g., one among the first access point AP1, the second access point AP2, the first station STA1, the second station STA2, the third station STA3 or the fourth station STA4).

Referring to FIG. 2, the first wireless communication apparatus 21 may include an antenna 21_2, a transceiver 21_4, and/or a processing circuit 21_6. In embodiments, the antenna 21_2, the transceiver 21_4, and the processing circuit 21_6 may be included in one package, or may be included in different packages, respectively. The second wireless communication apparatus 22 may also include an antenna 22_2, a transceiver 22_4, and/or a processing circuit 22_6. Hereinafter, overlapping descriptions of the first wireless communication apparatus 21 and the second wireless communication apparatus 22 will be omitted.

The antenna 21_2 may receive a signal from the second wireless communication apparatus 22, may provide the signal to the transceiver 21_4, and/or may transmit a signal provided from the transceiver 21_4 to the second wireless communication apparatus 22. In embodiments, the antenna 21_2 may include a plurality of antennas for multiple-input-multiple-output (MIMO). Also, in embodiments, the antenna 21_2 may include a phased array for beamforming.

The transceiver 21_4 may process a signal received from the second wireless communication apparatus 22 through the antenna 21_2, and may provide the processed signal to the processing circuit 21_6. Also, the transceiver 21_4 may process a signal provided from the processing circuit 21_6, and may output the processed signal through the antenna 21_2. In embodiments, the transceiver 21_4 may include an analog circuit such as (e.g., including) a low noise amplifier, a mixer, a filter, a power amplifier, an oscillator, and the like. In embodiments, the transceiver 21_4 may process the signal received from the antenna 21_2 and/or the signal received from the processing circuit 21_6, based on (e.g., under the) control of the processing circuit 21_6.

The processing circuit 21_6 may extract information transmitted by the second wireless communication apparatus 22 by processing a signal received from the transceiver 21_4. For example, the processing circuit 21_6 may extract information by demodulating and/or decoding the signal received from the transceiver 21_4. In addition, a signal including information to be transmitted to the second wireless communication apparatus 22 may be generated and provided to the transceiver 21_4. For example, the processing circuit 21_6 may provide a signal generated by encoding and/or modulating data to be transmitted to the second wireless communication apparatus 22, to the transceiver 21_4. In embodiments, the processing circuit 21_6 may include a programmable component, such as a central processing unit (CPU), a digital signal processor (DSP), or the like, or a reconfigurable component, such as a field programmable gate array (FPGA), or the like, and may include a component providing a fixed function, such as an intellectual property (IP) core, or the like. In embodiments, the processing circuit 21_6 may include or may access memory that stores data and/or a series of instructions.

Figure 3:
FIG. 3 is a view illustrating a system band of a wireless communication system according to embodiments.

FIG. 3 is a view illustrating a system band of a wireless communication system according to embodiments.

FIG. 3 illustrates unlicensed bands UNII5 to UNII8 (e.g., the unlicensed bands UNII5, UNII6, UNII6/7, UNII7, UNII7/8 and UNII8) that may be used in 6 GHz WLAN such as 802.11ax or the like. Some of the unlicensed bands UNII5 to UNII8 may be allocated to a wireless communication system. For example, in the wireless communication system 10 of FIG. 1, the first access points AP1 may allocate a system band for communication with the stations STA1 to STA4 in the first coverage 11, and the second access point AP2 may allocate a system band for communication with the stations STA3 and STA4 in the second coverage 12. A bandwidth of a system band may be determined by 802.11 standards. For example, in 802.11be referred to as extremely-high-throughput (EHT), a system band having a bandwidth of up to 320 MHz may be allocated, and a system band having a bandwidth of 160 MHz or 80 MHz may be allocated.

A system band may be divided into a plurality of sub-bands. For example, a magnitude of one sub-band may be 20 MHz. At least one sub-band may be allocated for transmitting a PPDU. Hereinafter, the sub-band allocated to transmit the PPDU may be referred to as a PPDU band. For example, the PPDU band may have a bandwidth of 20 MHz, 40 MHz, 80 MHz, 160 MHz, or 320 MHz.

Figure 4:
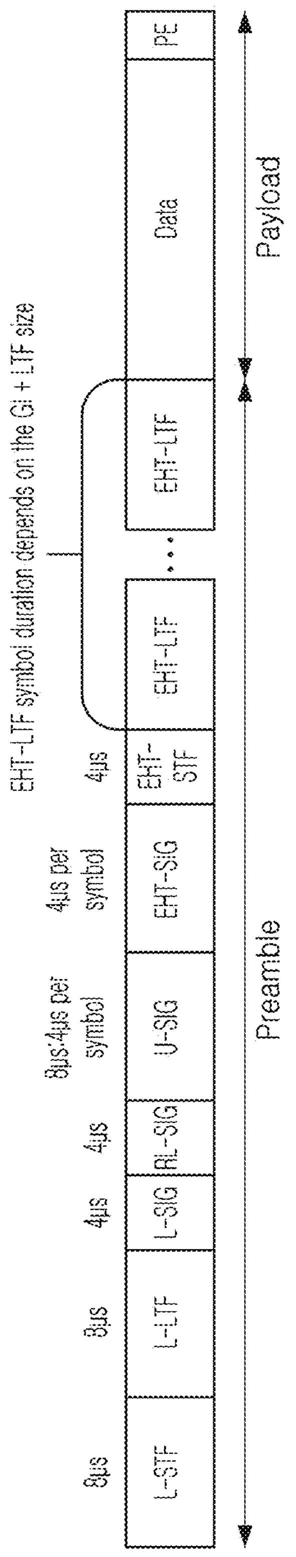
FIG. 4 is a view illustrating an EHT MU PPDU of a wireless communication system according to embodiments.

FIG. 4 is a view illustrating an EHT multi-user (MU) PPDU of a wireless communication system according embodiments. While HE defines HE MU PPDU and HE single-user (SU) PPDU, the EHT may not define the EHT SU PPDU and may transmit the EHT MU PPDU to a single user. The EHT MU PPDU may be configured in a compressed mode or a non-compressed mode, and may include OFDM symbols in the non-compressed mode.

Referring to FIG. 4, the EHT MU PPDU may include a preamble including training fields and signaling fields, and a payload including a data field. In the EHT MU PPDU, the preamble may include a legacy-short training field (L-STF), a legacy-long training field (L-LTF), a legacy-signal (L-SIG) field, a repeated legacy-signal (RL-SIG) field, a universal signal (U-SIG) field, an extremely high throughput-signal (EHT-SIG) field, an extremely high throughput-short training field (EHT-STF), and/or an extremely high throughput-long training field (EHT-LTF). In addition, in the EHT MU PPDU, the payload may include the data field and/or a packet extension (PE) field. According to embodiments, a symbol duration of the EHT-LTF may depend on a guard interval (GI) size and the LTF size.

The L-STF field may include a short training OFDM symbol, and may be used for frame detection, automatic gain control (AGC), diversity detection, and/or coarse frequency/time synchronization. The L-LTF field may include a long training OFDM symbol, and may be used for fine frequency/time synchronization and/or channel estimation. The L-STF field and the L-LTF field may have a fixed length (e.g., 8 μs).

The L-SIG field may be used for transmission of control information, and may include information on data rate and data length. In embodiments, the L-SIG field may be repeated in the RL-SIG field. The L-SIG field and the RL-SIG field may have a fixed length (e.g., 4 μs).

The U-SIG field may include control information common to at least one station receiving the EHT MU PPDU, and may correspond to HE-SIG-A of HE. In embodiments, the U-SIG field may further include fields and reserved bits respectively corresponding to a cyclic redundancy check (CRC) and a tail. Version independent fields may have static positions and bit definitions in different generations and/or physical versions. In embodiments, the U-SIG field, unlike the EHT-SIG field described below, may be modulated in a single modulation mode, such as based on binary phase-shift keying (BPSK).

The EHT-SIG field may have a variable modulation coding scheme (MCS) and a variable length, and may correspond to HE-SIG-B of HE. For example, when the EHT MU PPDU is transmitted to a plurality of users, the EHT-SIG field may include a common field including common control information and/or a user-specific field including user-dependent control information. As illustrated in FIG. 3, the U-SIG field may have a fixed length (e.g., 8 μs), while the EHT-SIG field may have a variable length. The common field may include U-SIG overflow, total number of non-OFDMA users, and/or a resource unit (RU) allocation subfield (RUA). A user-specific field for non-MU MIMO may include a STA-ID subfield, an modulation coding scheme (MCS) subfield, a number of space time streams (NSTS) subfield, a Beamformed subfield, and/or a coding subfield, and a user-specific field for MU-MIMO may include a STA-ID subfield, an MCS subfield, a coding subfield, and/or a spatial configuration subfield. In embodiments, the EHT-SIG field may be modulated based on one of two or more modulation modes, such as BPSK, quadrature binary phase shift keying (QBPSK), or the like.

The data field may have a variable length, and may include user data. A PPDU band may have a plurality of sub-carriers. In the data field, the plurality of sub-carriers may include different data. In particular, the EHT MU PPDU may include an OFDMA symbol, and a plurality of sub-carriers having frequencies orthogonal to each other in a data field may be allocated to different stations.

The PE field may be a field added to an end of the PPDU such that sufficient time for a receiver to process the PPDU is guaranteed, and may include arbitrary padding data.

As described above, a PPDU band may include one or more sub-bands. When a plurality of sub-bands are allocated for PPDU transmission, consecutive sub-bands, which are consecutive to each other, may be allocated. When some sub-bands among the consecutive sub-bands are in a busy state, the sub-bands may not be used for the PPDU transmission. In 802.11ax standards, puncturing, which transmits a PPDU using sub-bands other than some sub-bands, in consecutive PPDU bands, may be supported.

Figure 5:
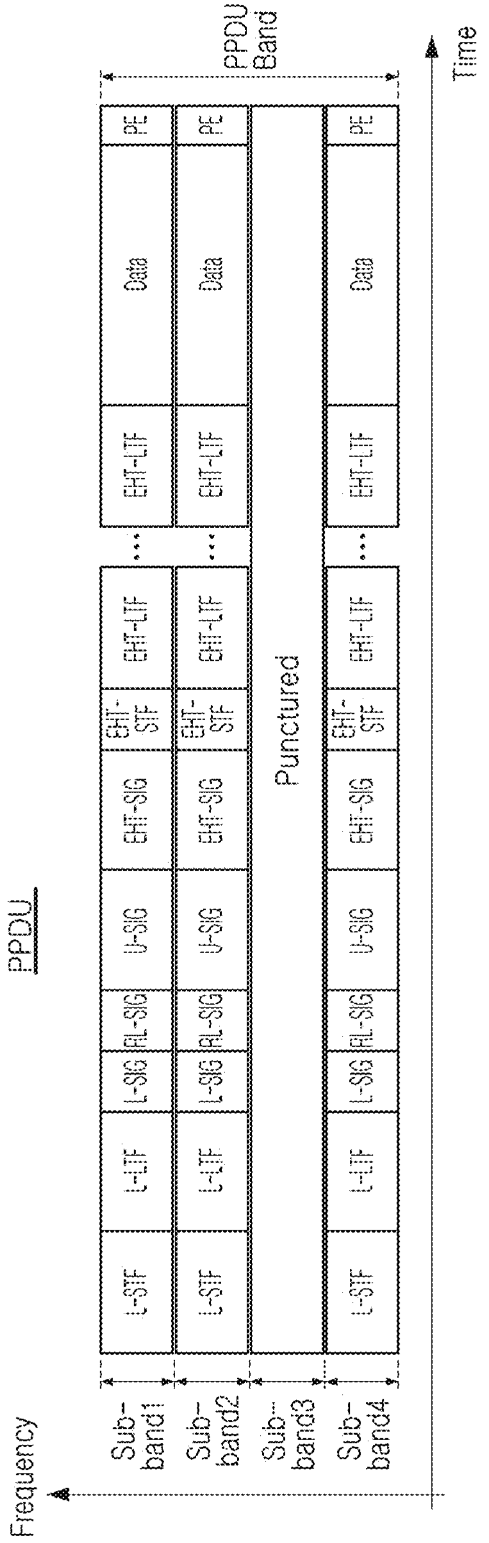
FIG. 5 is a view illustrating an example of a PPDU punctured in a wireless communication system according to embodiments.

FIG. 5 is a view illustrating an example of a PPDU punctured in a wireless communication system according to embodiments. Specifically, FIG. 5 illustrates a PPDU in a time domain and a frequency domain.

Referring to FIG. 5, a PPDU band may include four consecutive sub-bands Sub-band1 to Sub-band4. For example, each of the sub-bands may be 20 MHz, and the PPDU band may be 80 MHz.

In the example of FIG. 5, a valid PPDU signal may be transmitted through the first sub-band Sub-band1, the second sub-band Sub-band2, and the fourth sub-band Sub-band4, included in the PPDU band. In the PPDU band, the third sub-band Sub-band3 may be punctured. For example, the third sub-band Sub-band3 may be in a busy state, and a signal unrelated to a PPDU signal may be transmitted in the third sub-band Sub-band3. Hereinafter, among the sub-bands included in the PPDU band, a sub-band through which the valid PPDU signal is transmitted may be referred to as a valid sub-band.

In valid sub-bands, the PPDU signal may have a packet structure as described with reference to FIG. 4. For example, in each of the valid sub-bands, the PPDU signal may include a preamble and a payload. In each of the valid sub-bands, the payload may include different information. In each of the valid sub-bands, preambles may include the same information (or similar information). For example, the preambles may overlap (e.g., contain the same information or similar information) on each of the valid sub-bands. A receiving side of a wireless communication system may acquire a signal having improved SNR by combining preambles received from the valid sub-bands in a frequency domain. In addition, the receiving side may acquire accurate information about a PPDU by decoding the SNR-improved signal.

When the receiving side incorrectly determines which of a plurality of sub-bands included in a system band are valid sub-bands, the receiving side may incorrectly combine signals unrelated to the preambles. The SNR of the signal acquired due to the combining of the incorrect signals may be rather deteriorated, as compared to SNR of uncombined preambles. Therefore, in order for the receiving side to acquire a preamble having an improved SNR, detection of which sub-bands, among the plurality of sub-bands included in the system band, are valid sub-bands should be performed accurately.

The receiving side may acquire reception synchronization using at least one of an L-STF field or an L-LTF field, first received in the PPDU. Specifically, the receiving side may receive a signal of the entire system band, and may separate the received signal into a sub-band unit using a band pass filter or a band separation filter. The receiving side may detect reception of the PPDU by measuring correlation of signals separated in sub-band units in the time domain.

The receiving side may detect that the L-STF field and the L-LTF field are received, when sub-bands having a correlation value exceeding a predetermined (or alternatively, given) threshold value are detected, and may estimate the sub-bands as valid sub-bands (or candidate sub-band signals as discussed further below). And, the receiving side may acquire frequency synchronization and time synchronization for the estimated sub-bands. The receiving side may perform decoding on an L-SIG field, an RL-SIG field, and a U-SIG field, received after the L-STF field and the L-LTF field, based on the frequency synchronization and the time synchronization, obtained above.

The U-SIG field may include band information indicating the valid sub-bands. When valid sub-bands estimated based on correlation of the L-STF field or the L-LTF field are estimated incorrectly, it may be difficult to acquire a preamble signal having an improved SNR until the U-SIG field is successfully decoded.

Determining a valid sub-band by comparing correlation in a time domain of the L-STF field or the L-LTF field with a fixed threshold value may be less accurate. In a trend of increasing system bandwidth with the development of 802.11 standards, a PPDU band may have various bandwidths, and reception power for one sub-band may be changed. Therefore, it may be difficult to detect valid sub-bands using the fixed threshold value. In addition, since puncturing is supported in standards such as 802.11ax, the fact that valid sub-bands are not necessarily consecutive may make it more difficult for the receiving side to estimate the valid sub-bands.

In addition, the PPDU may transmit or receive a signal in an OFDM or OFDMA scheme, and a valid sub-band may have a plurality of sub-carriers. In a transmitting side of the wireless communication system, valid information may not be included in a DC sub-carrier having a center frequency of '0' in a sub-band and in guard sub-carriers having frequencies on both ends. Since noise components of the DC sub-carriers and the guard sub-carriers may be mixed in the time domain, it may be difficult for the receiving side to determine the valid sub-band, based on the correlation in the time domain.

According to embodiments, the receiving side may select candidate sub-bands based on the correlation in the time domain of the L-STF field or the L-LTF field, and may determine a valid sub-band depending on whether SNR values of the candidate sub-bands exceed a threshold value. According to embodiments, the SNR values of the candidate sub-bands may be calculated as discussed in connection with equations 1-5 below. The threshold value may be determined based on a maximum (or highest) value among SNR values of the candidate sub-bands. Therefore, the threshold value may be flexibly set according to a variable reception channel state and the number of valid sub-bands, and the valid sub-band may be more accurately determined.

Specifically, the receiving side may use the SNR values of the candidate sub-bands to determine the threshold for determining whether specific sub-band is a valid sub-band, rather than relying solely on a SNR value of the specific sub-band. Accordingly, the receiving side can determine a more optimized threshold according to the number of valid sub-bands, in environments where signals carrying the same data can be received through one or more sub-bands.

Depending on an implementation, the SNR value may be calculated in the frequency domain. Since the DC sub-carriers and the guard sub-carriers are excluded (or reduced) when calculating the SNR value in the frequency domain, the valid sub-band may be more accurately determined.

According to embodiments, a receiving side may accurately determine valid sub-bands including a valid PPDU signal. And, the receiving side may acquire a signal having an improved SNR by combining preamble signals received from the valid sub-bands, and may acquire accurate preamble information using the acquired signal. As a result, PPDU processing performance of the receiving side may be improved.

Specifically, as the preamble signals contain same data, the preamble signals may have similar waveforms. By summing these preamble signals, constructive interference may occur. Therefore, the receiving side may acquire the signal having the improved SNR.

The preamble signals may carry useful information for decoding the PPDU. For example, the preamble signals may include information on a modulation scheme of the PPDU. The reception side may determine demodulation scheme based on the modulation scheme obtained from the preamble signals and may effectively demodulate the PPDU. According to embodiments, the receiving side may obtain accurate information from the combined preamble signal. Therefore, PPDU processing performance of the receiving side may be improved.

The present inventive concepts are not limited to a case in which a wireless communication system transmits an EHT PPDU, and may be applied even when the wireless communication system transmits a HT PPDU, a VHT PPDU, and/or a Non-HT PPDU.

Figure 6:
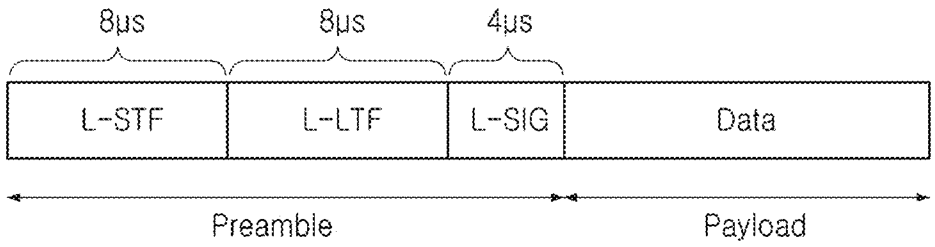
FIG. 6 is a view illustrating a Non-HT PPDU of a wireless communication system according to embodiments.

FIG. 6 is a view illustrating a Non-HT PPDU of a wireless communication system according to embodiments.

A Non-HT PPDU may include a preamble and a payload. The preamble of the Non-HT PPDU may include an L-STF field, an L-LTF field, and/or an L-SIG field, and the payload of the Non-HT PPDU may include a data field. The L-STF field, the L-LTF field, and the L-SIG field may include information, similar to that in the L-STF field, the L-LTF field, and the L-SIG field of the EHT PPDU described with reference to FIG. 4.

In a similar manner to the EHT PPDU, the Non-HT PPDU may be transmitted through a plurality of valid sub-bands. In the plurality of valid sub-bands including Non-HT PPDU, preambles may overlap.

The Non-HT PPDU may not include a U-SIG field, as described with reference to FIG. 4. Therefore, when a receiving side of a wireless communication system receives the Non-HT PPDU, it may be difficult to acquire information indicating valid sub-bands even when the PPDU is decoded.

According to embodiments, the receiving side may determine a valid sub-band depending on whether SNR values of candidate sub-bands selected based on correlation in a time domain of the L-STF field or the L-LTF field exceed a threshold value.

Hereinafter, a wireless communication system and a method of wireless communication according to embodiments will be described in more detail with reference to FIGS. 7 to 12.

Figure 7:
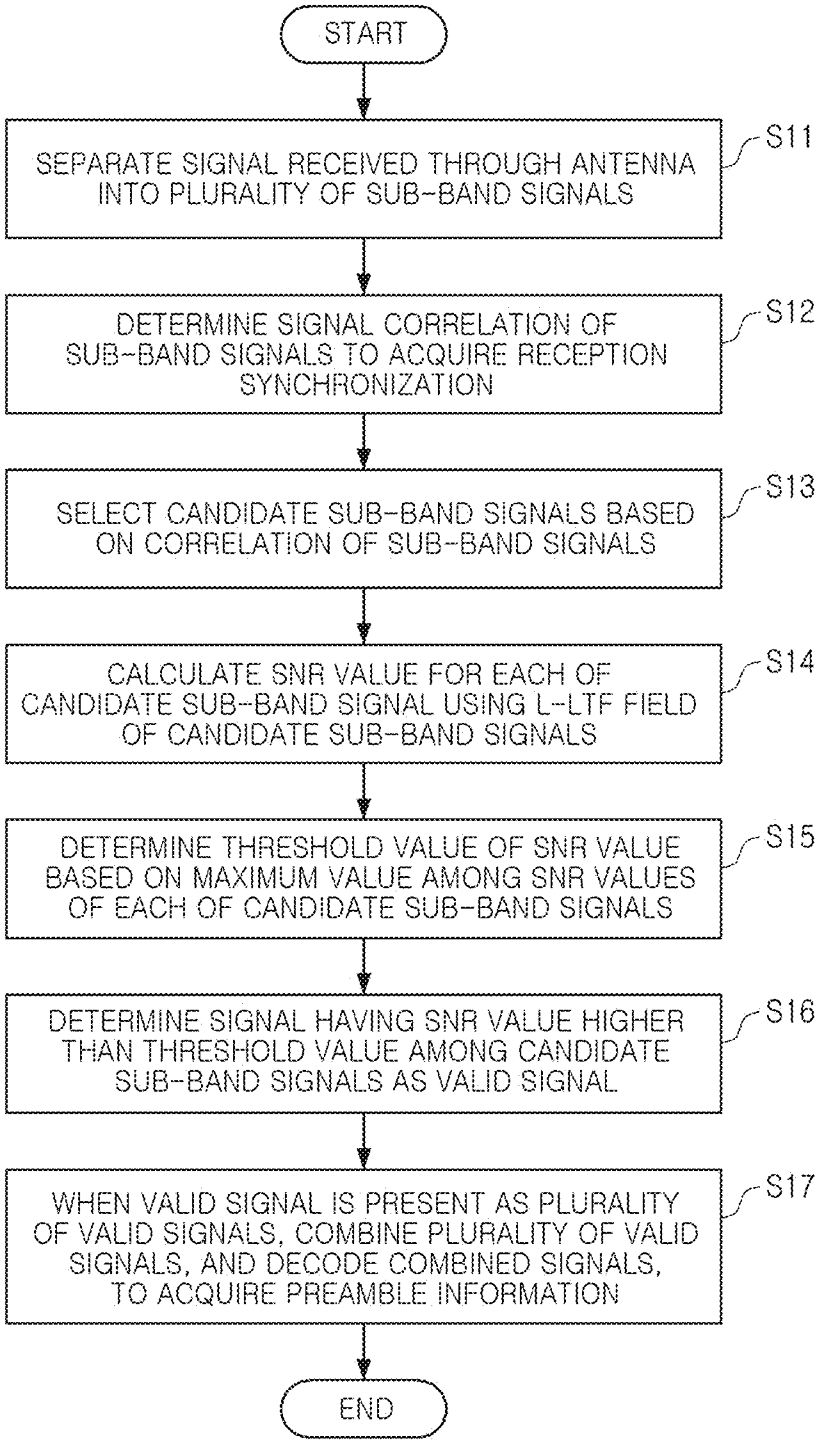
FIG. 7 is a flowchart illustrating a method of wireless communication according to embodiments.

FIG. 7 is a flowchart illustrating a method of wireless communication according to embodiments.

A method of wireless communication in FIG. 7 may be performed by the first wireless communication apparatus 21 and/or the second wireless communication apparatus 22 of the wireless communication system 20 described with reference to FIG. 2. In particular, the method of FIG. 7 may be performed when a station receives a downlink signal from an access point.

In operation S11, a transceiver of a station may separate a signal received through an antenna into a plurality of sub-band signals. For example, the station may include band pass filters respectively passing through sub-bands, and may separate the received signal into the plurality of sub-band signals using the band pass filters.

In operation S12, the transceiver may determine signal correlation in a time domain using an L-STF field and/or an L-LTF field of the plurality of sub-band signals, to acquire reception synchronization.

As a first example, symbols transmitted in the L-STF field and symbols transmitted in the L-LTF field may be defined in 802.11 standards, and may be identical (or similar) in all PPDUs transmitted in a wireless communication system. The transceiver may calculate cross-correlation by performing a convolution operation between the symbols (e.g., transmitted in the L-STF field and/or L-LTF field) defined in the standards (may also be referred to herein as a signal of a training field) and the symbols (e.g., transmitted in the L-STF field and/or L-LTF field) received in each of the sub-bands in the time domain. According to embodiments, the convolution operation may be performed for each of the plurality of sub-band signals. Also, the transceiver may acquire time synchronization and frequency synchronization for sub-band signals (e.g., the L-STF field and/or L-LTF field) of which a value of cross-correlation exceeds a predetermined (or alternatively, given) threshold value (e.g., a first threshold value), among the plurality of sub-band signals.

As a second example, the L-STF field and the L-LTF field may include the same symbols (or similar symbols) repeated in the time domain. The transceiver may calculate auto-correlation by performing a convolution operation on signals in different time periods in the time domain (e.g., performing convolution on different the L-STF field and/or L-LTF field symbols received over the same sub-band, or similar sub-bands, at different times). According to embodiments, the convolution operation may be performed for each of the plurality of sub-band signals. Also, the transceiver may acquire time synchronization and frequency synchronization for sub-band signals (e.g., the L-STF field and/or L-LTF field) of which a value of auto-correlation exceeds a predetermined (or alternatively, given) threshold value (e.g., a second threshold value).

In operation S13, the transceiver may select candidate sub-band signals, based on correlation of the plurality of sub-band signals. Specifically, the transceiver may select sub-band signals having a correlation value (e.g., the cross-correlation value or the auto-correlation value) exceeding a predetermined (or alternatively, given) threshold value (e.g., a third threshold value), among the plurality of sub-band signals, as the candidate sub-band signals. According to embodiments, the third threshold value may be the first threshold value or the second threshold value).

In operation S14, the transceiver may calculate an SNR value for each of the candidate sub-band signals using an L-LTF field of the candidate sub-band signals (e.g., based on a corresponding SNR of the L-LTF field of each of the candidate sub-band signals). Depending on an implementation, the transceiver may remove an effect of noise due to DC sub-carriers and guard sub-carriers on an SNR value by calculating the SNR value in a frequency domain. A method of calculating an SNR value for each candidate sub-band signal will be described later with reference to FIG. 8.

In operation S15, the transceiver may determine a threshold value of the SNR value based on a maximum (or highest) value among the SNR values of each of the candidate sub-band signals. According to embodiments, the transceiver may adaptively determine the threshold value of the SNR value using the maximum (or highest) value in which a reception channel state is reflected. A method of determining the threshold value of the SNR value will be described in detail with reference to FIGS. 9A to 9D and FIGS. 10 and 11.

In operation S16, the transceiver may determine a signal having an SNR value higher than the threshold value, among the candidate sub-band signals, as a valid signal. For example, the transceiver may determine candidate sub-band signals having an SNR value within a predetermined (or alternatively, given) range from the maximum (or highest) value, as valid signals. The transceiver may deliver a valid signal to a processing circuit (e.g., the processing circuit 21_6, the processing circuit 22_6, and/or a different portion of the processing circuit 21_6 or the processing circuit 22_6).

In operation S17, when a plurality of signals among the candidate sub-band signals are determined as being the valid signals, the processing circuit may combine the plurality of valid signals, and may decode the combined signals, to acquire a preamble signal having an improved SNR. According to embodiments, this preamble signal may be used to decode the payload of the PPDU (e.g., containing information such as user data).

Figure 8:
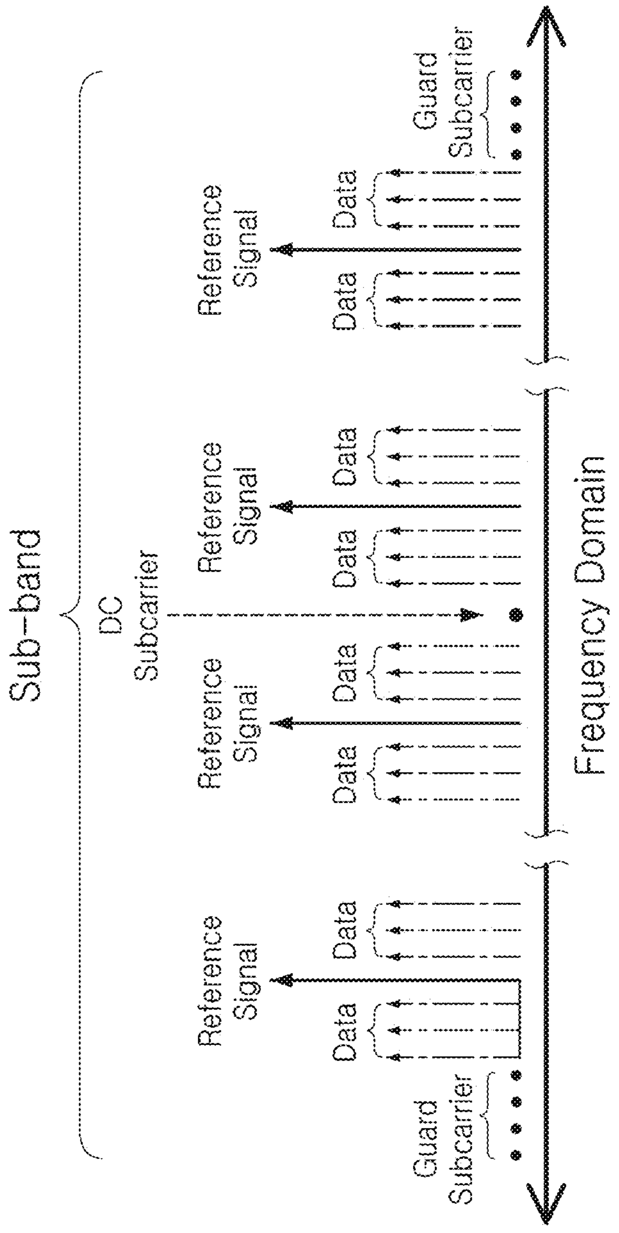
FIG. 8 is a view illustrating a signal transmitted through one sub-band in a frequency domain in a wireless communication system according to embodiments.

FIG. 8 is a view illustrating a signal transmitted through one sub-band in a frequency domain in a wireless communication system according to embodiments.

FIG. 8 illustrates a center frequency of each of a plurality of sub-carriers. In OFDM, the plurality of sub-carriers may be orthogonal to each other in view of the fact stating that an inner product of any two sub-carriers is zero (0). Sub-carrier signals to be orthogonal to each other may be evenly spaced. In OFDMA, subsets of sub-carriers to be orthogonal to each other may be assigned to different users, e.g., different stations.

Not all sub-carriers included in one sub-band may be used for signal transmission. For example, to prevent (or reduce) interference between adjacent sub-bands, several sub-carriers on both ends of the one sub-band may not include a signal as guard sub-carriers (e.g., so as to provide a guard sub-carrier function). In addition, to prevent (or reduce) DC offset, a sub-carrier having a center frequency of '0' in one sub-band may be a DC sub-carrier, and may not include a signal. Remaining sub-carriers may include sub-carriers for transmitting data and sub-carriers for transmitting a reference signal for channel estimation. For example, the remaining sub-carriers may include valid symbols.

According to embodiments, when an SNR value of a candidate sub-band is calculated, a station may remove the DC sub-carrier and a guard sub-carrier(s) in a frequency domain, and may calculate an SNR value for the remaining sub-carriers. A method of calculating an SNR value in a frequency domain will be as follows.

An L-LTF field may have a repeating pattern of the same OFDM symbols (or similar OFDM symbols). Magnitudes in the frequency domain of a first signal in a first time period, each including the same OFDM symbols (or similar OFDM symbols), and a second signal in a second time period may be expressed as illustrated in [Equation 1] and [Equation 2], respectively.

$$LTF_{t,1}(f) = s(f) + n_1(f) \quad \text{[Equation 1]}$$

$$LTF_{t,2}(f) = s(f) + n_2(f) \quad \text{[Equation 2]}$$

In this case, $LTF_{t,1}(f)$ may be a magnitude of a first signal in a sub-carrier f, $LTF_{t,2}(f)$ may be a magnitude of a second signal in the sub-carrier f, s(f) may be a magnitude of an OFDM symbol common to the first signal and the second signal in the sub-carrier f, $n_1(f)$ may be a magnitude of noise in the sub-carrier f in the first signal, and $n_2(f)$ may be a magnitude of noise in the sub-carrier f in the second signal. $n_1(f)$ and $n_2(f)$ may be Gaussian noise having a normal distribution $$CN(0, \sigma_n^2).$$

According to embodiments, the first and second signals in the first and second time periods are signals of the L-LTF field, and may be converted to corresponding signals in the frequency domain on which $LTF_{t,1}(f)$ and $LTF_{t,2}(f)$ are based.

A signal obtained by adding the first signal and the second signal in the frequency domain may be expressed as in [Equation 3] below.

$$y(f) = LTF_{t,1}(f) + LTF_{t,2}(f) \quad \text{[Equation 3]}$$

In this case, y(f) may be a signal obtained by adding $LTF_{t,1}(f)$ and $LTF_{t,2}(f)$. If variance of signal s(f) is $$\sigma_s^2,$$

variance of y(f) may be $$(4\sigma_S^2 + 2\sigma_n^2).$$

A signal obtained by subtracting the first signal and the second signal in the frequency domain may be expressed as in [Equation 4] below.

$$w(f) = LTF_{t,1}(f) - LTF_{t,2}(f) \quad \text{[Equation 4]}$$

In this case, w(f) may be a signal obtained by subtracting $LTF_{t,2}(f)$ from $LTF_{t,1}(f)$. Variance of w(f) may be $$2\sigma_n^2.$$

The SNR value in the frequency domain may be determined based on Equation 5 below.

$$SNR_{dB}(f) = 10 \cdot \log_{10}\left(\frac{|y(f)|^2 - |w(f)|^2}{2 \cdot |w(f)|^2}\right) \quad \text{[Equation 5]}$$

In this case, $SNR_{dB}(f)$ may be a function representing the SNR value of the sub-carrier f of the L-LTF field. According to embodiments, the SNR value of each of a plurality of sub-carriers (the sub-carriers including the valid symbols, such as sub-carriers other than the DC sub-carrier and guard sub-carriers) of the L-LTF field may be calculated using Equation 5.

According to embodiments, a station may determine an SNR value of the L-LTF field in the frequency domain by summing $SNR_{dB}$ values at center frequencies of remaining sub-carriers except for a DC sub-carrier and guard sub-carriers in a sub-band. According to embodiments, a respective SNR value may be determined for each of the plurality of candidate sub-band signals by summing the calculated SNR values of each of the plurality of sub-carriers (the sub-carriers including the valid symbols) of the L-LTF field in the corresponding candidate sub-band signal.

According to embodiments, the station may determine a threshold value as a criterion for determining a valid sub-band based on a maximum (or highest) value, among SNR values of the L-LTF field calculated from a plurality of candidate sub-bands. For example, a threshold value of SNR may be determined based on Equation 6 below.

$$SNR_{th} = SNR_{ref} - \alpha \quad \text{[Equation 6]}$$

In this case, $SNR_{th}$ may be an SNR threshold value, $SNR_{ref}$ may be a maximum (or highest) value among SNR values, and a may be zero (0) or a positive real number. For example, among candidate sub-bands, sub-bands having an SNR value within a predetermined (or alternatively, given) range from $SNR_{ref}$ may be determined as valid sub-bands, and sub-bands having an SNR value out of (or equal to) the predetermined (or alternatively, given) range from $SNR_{ref}$ may be determined as invalid sub-bands. Hereinafter, a for determining the SNR threshold value based on the maximum (or highest) value may be referred to as a difference value.

The difference value may be determined in advance (e.g., using historical data, reference data, experimental data, etc. collected before performing the operations discussed in connection with FIG. 7). For example, the difference value may be selected based on a cumulative distribution function representing distribution of differences between SNR values of the valid sub-bands and SNR values of the invalid sub-bands (e.g., by performing the operations discussed in connection with FIGS. 9A-9D below).

FIG. 9A to 9D are views illustrating in detail a method of wireless communication according to embodiments.

FIGS. 9A to 9D illustrate probability distribution of SNR values of valid sub-bands and invalid sub-bands included in a system band.

Figures 9A, 9B, 9C, 9D:
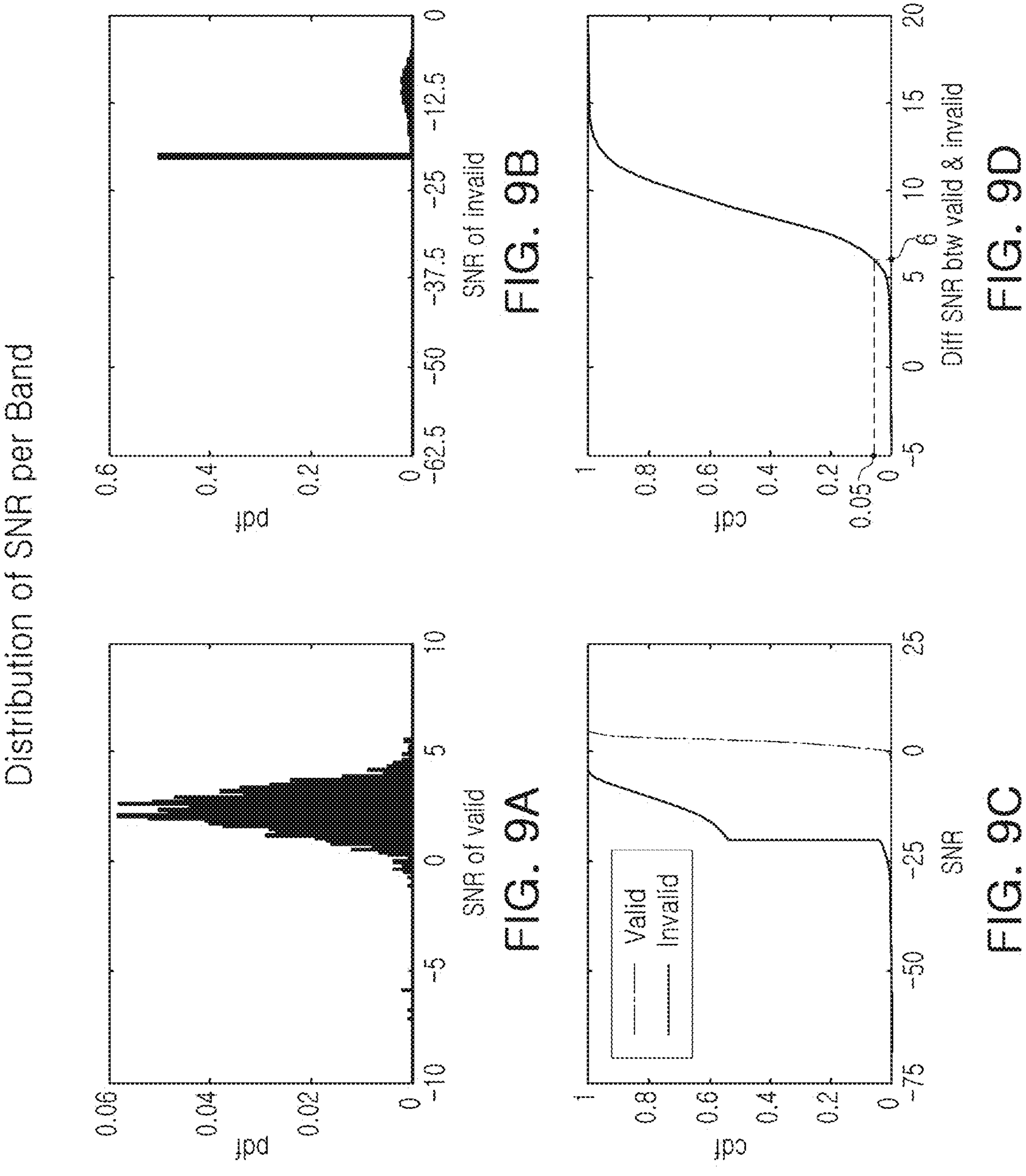
FIGS. 9A to 9D are views illustrating in detail a method of wireless communication according to embodiments.

FIG. 9A is a graph illustrating probability density functions (pdf) of SNR values of a valid sub-band. FIG. 9B is a graph illustrating probability density functions (pdf) of SNR values of an invalid sub-band. Referring to FIG. 9A, SNR values of a valid sub-band may be mostly distributed between 0 dB and 5 dB with a center of about 2.5 dB. Referring to FIG. 9B, SNR values of an invalid sub-band may be mainly distributed around −20 dB, but may also be somewhat distributed around −10 dB.

FIG. 9C is a graph illustrating distribution of the SNR values of the valid sub-band illustrated in FIG. 9A and distribution of the SNR values of the invalid sub-band illustrated in FIG. 9B, as a cumulative distribution function (cdf). FIG. 9D is a graph illustrating a difference between the SNR values of the valid sub-band and the SNR values of invalid sub-band, as a cumulative distribution function (cdf).

According to embodiments, a difference value may be selected based on the graph of FIG. 9D. In the example of FIG. 9D, 6 dB corresponding to a lower 5% portion of the difference between the SNR values of the valid sub-band and the SNR values of invalid sub-band in the cumulative distribution function (cdf) may be selected as a difference value a. For example, candidate sub-bands having an SNR value within 6 dB from a maximum (or highest) value may be determined as valid sub-bands, and candidate sub-bands having an SNR value more than 6 dB from the maximum (or highest) value may be determined as invalid sub-bands.

It is only illustrative that the difference value $\alpha$ is determined as being 6 dB, and embodiments are not limited thereto. The difference value $\alpha$ may be experimentally determined, and may be changed according to receiver's AGC, antenna gain, or radio frequency (RF) gain.

A transmitter may transmit a PPDU with uniform transmission power, regardless of a PPDU bandwidth. For example, as the PPDU bandwidth increases, transmission power for sub-band may decrease, and SNR of a valid sub-band on a receiving side may decrease. Also, the difference between the SNR values of valid sub-bands and invalid sub-bands may be changed according to the PPDU bandwidth.

Figure 10:
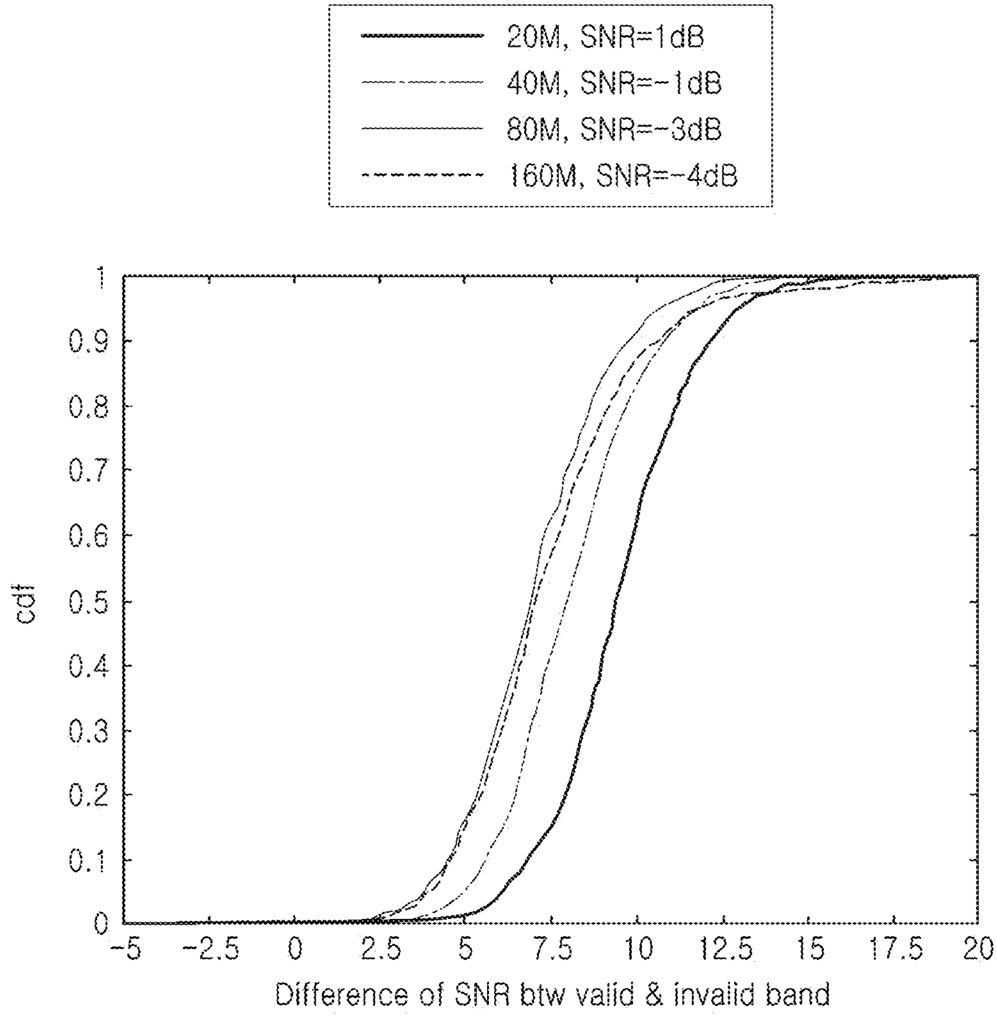
FIG. 10 is a view illustrating a difference in SNR values according to PPDU bandwidths in a wireless communication system according to embodiments.

FIG. 10 is a view illustrating a difference in SNR values according to PPDU bandwidths in a wireless communication system according to embodiments.

FIG. 10 illustrates a cumulative distribution function (cdf) of a difference between an SNR value of a valid sub-band and an SNR value of an invalid sub-band, according to a PPDU bandwidth. As the PPDU bandwidth increases to 20 MHz, 40 MHZ, 80 MHz, and 160 MHZ, the SNR value of the valid sub-band may decrease according to 1 dB, −1 dB, −3 dB, and −4 dB. And, referring to the cumulative distribution function (cdf), as the PPDU bandwidth increases, the difference in SNR values may decrease.

According to embodiments, a difference value for determining an SNR threshold value may be determined according to the number of candidate sub-bands. For example, a plurality of difference values may be determined according to a section (e.g., range) of the number of the candidate sub-bands, and one difference value among the plurality of difference values may be selected based on the number of candidate sub-band signals (e.g., as discussed in connection with Equation 7 below). This may be because the number of candidate sub-bands may be related to the number of sub-bands included in the PPDU bandwidth.

As the PPDU bandwidth increases, the SNR difference may decrease. As the number of candidate sub-bands increases, the difference value is not necessarily determined to be a small value. For example, the difference value according to the number of candidate sub-bands may be determined based on the cumulative distribution function (cdf) representing the difference in SNR values according to the PPDU bandwidth, but may be determined by considering false detection probability and non-detection probability. Specifically, when the PPDU bandwidth is large, SNR values of a certain valid sub-band may be significantly lower than the maximum (or highest) value. When the difference value is determined as a small value, as the number of candidate sub-bands increases, non-detection probability of the valid sub-band may increase. Considering the non-detection probability, the difference value may be determined as a large value, as the number of candidate sub-bands increases. According to embodiments, the difference value may increase as the number of candidate sub-bands increases.

The SNR threshold value according to the number of candidate sub-bands may be determined as illustrated in [Equation 7] below.

$$SNR_{th} = \begin{cases} SNR_{ref} - (\alpha + p) & \text{if } N < 4 \\ SNR_{ref} - (\alpha + q) & \text{if } 4 \le N < 8 \\ SNR_{ref} - (\alpha + r) & \text{if } 8 \le N < 16 \\ SNR_{ref} - (\alpha + s) & \text{otherwise} \end{cases} \quad \text{[Equation 7]}$$

In this case, $SNR_{th}$ may be a threshold value of SNR, N may be the number of candidate sub-bands, and (α+p), (α+q), (α+r), and (α+s) may be difference values according to the number of candidate sub-bands. α may be referred to as a basic difference value, and p, q, r, and s may be referred to as adjustment values according to the number of candidate sub-bands. For example, α may be determined as being 6 dB, and p, q, r, and s may be determined as being 0 dB, 1.5 dB, 3 dB, and 3 dB, respectively. The values of α, p, q, r, and s may be only illustrative, and the values of α, p, q, r, and s may be changed according to receiver's AGC, antenna gain, or RF gain.

Figure 11:
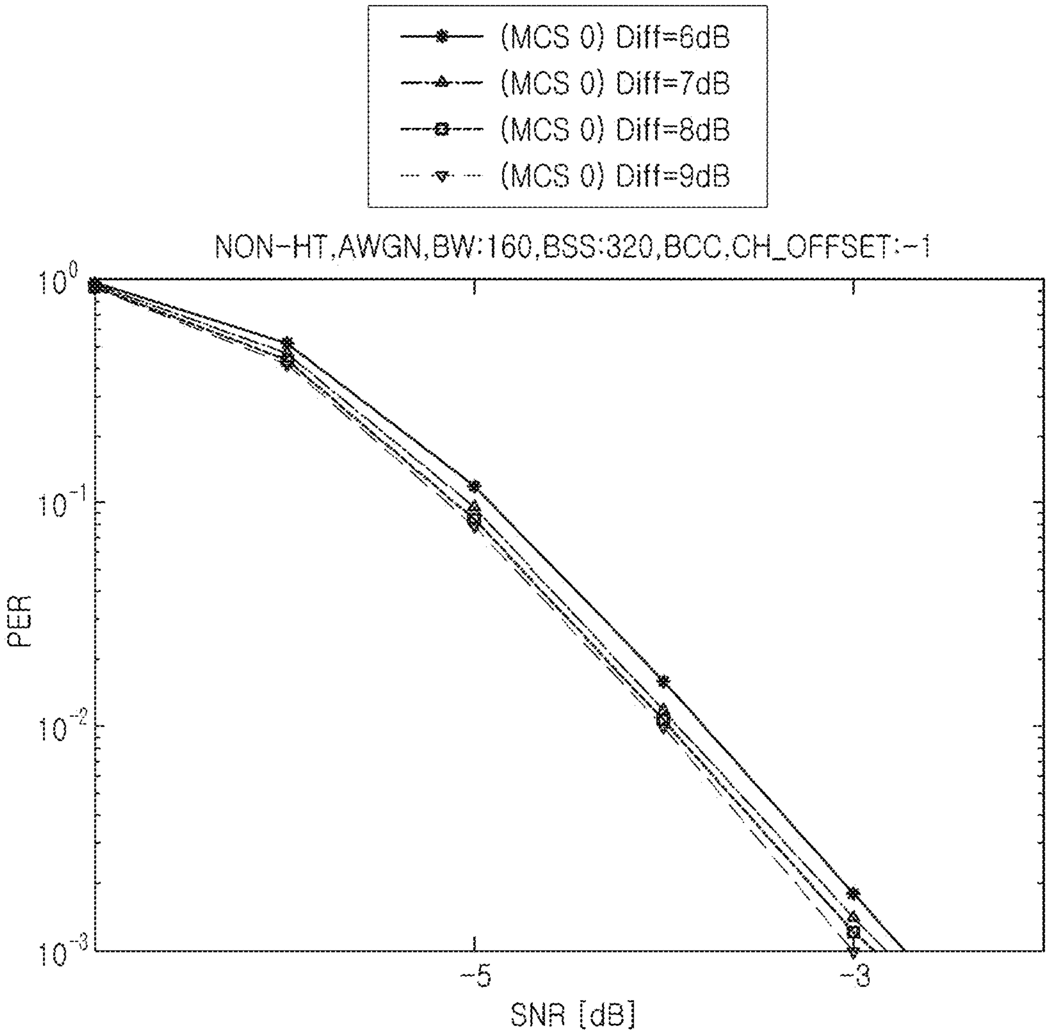
FIG. 11 is a view illustrating an effect of a method of wireless communication according to embodiments.

FIG. 11 is a view illustrating an effect of a method of wireless communication according to embodiments.

FIG. 11 illustrates a packet error rate (PER) according to SNR of a received signal, which varies according to a difference value for determining a threshold value of the SNR. As described above, a station may acquire a signal having an improved SNR by combining preambles included in valid sub-bands. Therefore, even when the SNR of the signal received by the station is the same (or similar), the PER may be lowered, as the valid sub-band is more accurately selected.

FIG. 11 illustrates a case in which a system bandwidth is 320 MHz in an additive white Gaussian noise (AWGN) channel, the station receives a Non-HT PPDU signal with a PPDU bandwidth of 160 MHz, and a modulation and coding scheme (MCS) level is '0'. In FIG. 11, simulation results obtained when a difference value (Diff) is selected as 6 dB, 7 dB, 8 dB, and 9 dB, respectively, are illustrated.

Referring to FIG. 11, even when the SNR of the received signal is the same (or similar), the PER may be changed according to the difference value. Specifically, the PER may be the lowest when the difference value is 9 dB. When the bandwidth of the sub-band is 20 MHz and the bandwidth of the PPDU is 160 MHz, the number of candidate sub-bands may be determined as being about 8. In the example of [Equation 7] described above, when the number of candidate sub-bands is 8, the threshold value may be determined as $SNR_{ref}$−(α+r). In an example where the α value is 6 dB and the r value is 3 dB, the difference value may be determined as (6+3)=9 dB. For example, when the threshold value for determining a valid sub-band is determined based on the difference value according to [Equation 7], the PER may be lowered. As a result, according to embodiments, PPDU processing performance may be improved.

Figure 12:
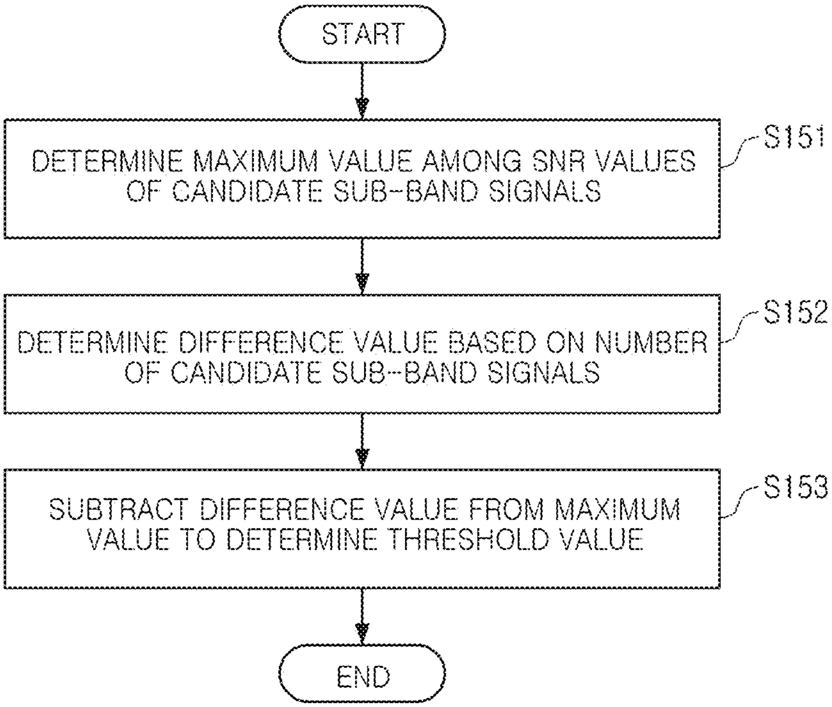
FIG. 12 is a flowchart specifically illustrating a threshold value determination method in a method of wireless communication according to embodiments.

FIG. 12 is a flowchart specifically illustrating a threshold value determination method in a method of wireless communication according to embodiments.

FIG. 12 is a view illustrating S15 described with reference to FIG. 7 in more detail. The operation S15 of FIG. 7 may include operations S151 to S153 of FIG. 12.

In operation S151, the station may determine the maximum (or highest) value among the SNR values of the candidate sub-band signals.

In operation S152, the station may determine a difference value based on the number of the candidate sub-band signals. The difference value according to the number of the candidate sub-band signals may be experimentally determined in advance, as described above.

In operation S153, the station may subtract the difference value from the maximum (or highest) value to determine a threshold value for determining a valid sub-band.

According to embodiments, a receiving side of a wireless communication system, for example, a station may select candidate sub-band signals based on correlation of sub-band signals determined based on an L-LTF field of a PPDU, and may determine valid sub-bands among the candidate sub-band signals based on SNR values of the candidate sub-band signals.

Specifically, the receiving side may determine a threshold value having a predetermined (or alternatively, given) difference value from a maximum (or highest) value among SNR values of candidate sub-bands, and may determine candidate sub-band signals having an SNR value exceeding the threshold value as valid sub-bands. The receiving side may adaptively determine a criterion for the valid sub-bands based on the maximum (or highest) value according to a receiving channel state. The difference value may be determined differently according to the number of the candidate sub-band signals.

Depending on an implementation, the receiving side may determine the SNR values of the candidate sub-bands in a frequency domain, and may determine the SNR values based on sub-carriers excluding (or reducing) a DC sub-carrier and guard sub-carriers in each of the candidate sub-bands. Therefore, an SNR value based on a valid signal may be determined more accurately.

A receiver and a method of wireless communication according to embodiments may determine candidate sub-bands based on a correlation of signals of a plurality of sub-bands of a system band, respectively, and may accurately determine a valid sub-band based on an SNR value of each of the candidate sub-bands.

A receiver and a method of wireless communication according to embodiments may combine signals of valid sub-bands determined based on SNR values of sub-bands, to accurately decode a preamble of a PPDU, and as a result, may improve processing performance of a payload.

Challenges addressed by the present inventive concepts are not limited to those mentioned above, and other challenges addressed and not mentioned will be clearly understood by those skilled in the art from the above description.

Conventional devices and methods for performing wireless communication are unable to effectively determine sub-bands (e.g., valid sub-bands) among a system band over which a PPDU is transmitted. As a result of, for instance, the use of puncturing the system band to avoid the use of busy sub-bands, determining the valid sub-bands is difficult using the conventional devices and methods as the valid sub-bands may not correspond to consecutive sub-bands. It is also difficult to determine the valid sub-bands using conventional devices and methods that rely on a fixed threshold under circumstances in which the quality of a communication channel over which the PPDU is transmitted varies. As the determination of the valid sub-bands cannot performed sufficiently effectively using the conventional devices and methods, the information contained in the preamble of the PPDU is unable to be decoded with sufficient accuracy resulting in insufficient performance (e.g., excessive packet error rate) in decoding the payload (e.g., user data) contained in the PPDU.

However, according to embodiments, improved devices and methods are provided for determining valid sub-bands among a system band over which a PPDU is transmitted. For example, the improved devices and methods may determine sub-bands of the system band having a correlation value (e.g., with respect to a training field) as candidate sub-bands, and determine valid sub-bands among the candidate sub-bands based on SNR values of the candidate sub-bands. The valid sub-bands may be determined as valid sub-bands based on a determination that SNRs of the valid sub-bands exceed a threshold, the threshold being based on a maximum (or highest) SNR among SNRs of the candidate sub-bands. Since the maximum (or highest) SNR among the SNRs of the candidate sub-bands reflects the changing characteristics of the communication channel over which the PPDU is transmitted, the threshold may be adaptively set to account for these changing characteristics enabling determination of the valid sub-bands with greater accuracy. As such, the information contained in the preamble of the PPDU may be decoded with greater accuracy, resulting in increased performance (e.g., decreased packet error rate) in decoding the payload data (e.g., user data) contained in the PPDU.

According to embodiments, operations described herein as being performed by the wireless communication system 10, the first access point AP1, the second access point AP2, the first station STA1, the second station STA2, the third station STA3, the fourth station STA4, the network 13, the first wireless communication apparatus 21, the second wireless communication apparatus 22, the wireless communication system 20, the transceiver 21_4, the processing circuit 21_6, the transceiver 22_4, and/or the processing circuit 22_6 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail herein. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. As used herein the term "and/or" includes any and all combinations of one or more of the associated listed items.

While embodiments have been illustrated and described above, it will be apparent to those skilled in the art that modifications and variations could be made without departing from the scope of the present inventive concepts as defined by the appended claims.

What is claimed is:

1. A method of wireless communication comprising:

dividing a signal received through an antenna into a plurality of sub-band signals;

selecting candidate sub-band signals from among the plurality of sub-band signals, the candidate sub-band signals having a correlation value exceeding a first threshold value; and acquiring preamble information of a physical layer protocol data unit (PPDU) based on a subset of the candidate sub-band signals having a signal-to-noise ratio (SNR) value higher than an SNR threshold value, the SNR threshold value being obtained by subtracting a difference value from a maximum SNR value, wherein the maximum SNR value is a maximum value among SNR values of the candidate sub-band signals.

2. The method of claim 1, further comprising:

determining the difference value based on a cumulative distribution function, the cumulative distribution function representing a distribution of differences between:

an SNR value of a valid signal having an SNR value higher than the SNR threshold value, and an SNR value of an invalid signal having an SNR value is-equal to or less than the SNR threshold value, the valid signal and the invalid signal being among sub-band signals included in a system band.

3. The method of claim 2, wherein the determining the difference value is based on the cumulative distribution function and a number of the candidate sub-band signals.

4. The method of claim 1, wherein the difference value increases as a number of the candidate sub-band signals increases.

5. The method of claim 1, further comprising:

determining a respective SNR value of each of the candidate sub-band signals based on a corresponding SNR value of a training field in each of the candidate sub-band signals.

6. The method of claim 1, further comprising:

determining a respective SNR value of each of the candidate sub-band signals based on a corresponding SNR value of a legacy-long training field (L-LTF) in each of the candidate sub-band signals.

7. The method of claim 1, further comprising:

calculating SNR values of the candidate sub-band signals based on a first signal of a field in a first time period and a second signal of the field in a second time period for each of the candidate sub-band signals.

8. The method of claim 1, wherein the difference value is zero or a positive real number.

9. The method of claim 1, wherein the selecting the candidate sub-band signals comprises calculating an auto-correlation by performing a convolution operation for signals received in different time periods, the convolution operation being performed for each of the plurality of sub-band signals; and the method further comprises:

detecting a subset of the plurality of sub-band signals having a training field in which a value of the auto-correlation exceeds the first threshold value, and acquiring time synchronization and frequency synchronization by using the training field.

10. The method of claim 9, wherein the training field comprises at least one of a legacy-short training field (L-STF) or a legacy-long training field (L-LTF).

11. The method of claim 1, wherein the selecting the candidate sub-band signals includes calculating a cross-correlation by performing a convolution operation between a respective signal of each of the plurality of sub-band signals and a signal of a training field; and the method further comprises acquiring time synchronization and frequency synchronization for a subset of the plurality of sub-band signals for which a value of the cross-correlation exceeds the first threshold value.

12. The method of claim 1, wherein the acquiring the preamble information comprises:

combining signals among the subset of the candidate sub-band signals to obtain a combined signal, and decoding the combined signal.

13. A method of wireless communication comprising:

dividing a signal received in a system band into a plurality of sub-band signals;

selecting candidate sub-band signals based on correlations of the plurality of sub-band signals in a time domain; and acquiring preamble information of a physical layer protocol data unit (PPDU) based on a valid signal among the candidate sub-band signals, the valid signal having a first signal-to-noise ratio (SNR) value higher than an SNR threshold value, the first SNR value being calculated based on first sub-carriers among a plurality of sub-carriers of signals in a field, the first sub-carriers including valid symbols, and the SNR threshold value being based on a maximum SNR value.

14. The method of claim 13, further comprising:

first converting a first signal of a first time period in the field into a converted first signal in a frequency domain;

second converting a second signal of a second time period in the field into a converted second signal in the frequency domain, the first converting and the second converting being performed for each respective candidate sub-band signal among the candidate sub-band signals;

determining a respective SNR value of each of the first sub-carriers including the valid symbols based on the converted first signal and the converted second signal; and summing the respective SNR values to calculate a candidate SNR value of each of the candidate sub-band signals.

15. The method of claim 14, wherein the first signal and the second signal comprise the same symbols in the valid signal.

16. An apparatus of wireless communication comprising:

processing circuitry configured to:

determine candidate sub-band signals from among a plurality of sub-band signals included in a system band based on a training field being detected in the candidate sub-band signals, determine a first valid signal from among the candidate sub-band signals, the first valid signal having a signal-to-noise ratio (SNR) value within a difference value from a maximum SNR value, the maximum SNR value being highest among SNR values of the candidate sub-band signals, the SNR values of the candidate sub-band signals being calculated by using repeated signal patterns in a time domain of a legacy-long training field (L-LTF) of the candidate sub-band signals, decode a preamble of a physical layer protocol data unit (PPDU) to obtain a decoded preamble, the preamble being acquired by combining the first valid signal with a second valid signal from among the candidate sub-band signals when the second valid signal is determined to have an SNR value within the difference value from the maximum SNR value, and decode a payload of the PPDU based on the decoded preamble.

17. The apparatus of claim 16, wherein the processing circuitry is configured to detect the training field based on each of the candidate sub-band signals having a correlation value exceeding a threshold value.

18. The apparatus of claim 16, wherein the SNR values of the candidate sub-band signals include a corresponding SNR value of each of the candidate sub-band signals; and the processing circuitry is configured to calculate the corresponding SNR value of each of the candidate sub-band signals by:

converting each of the repeated signal patterns into frequency domain signals, and summing respective SNR values of sub-carriers including valid symbols based on the frequency domain signals.

19. The apparatus of claim 16, wherein the processing circuitry is configured to select the difference value from among a plurality of difference values according to a range corresponding to a number of the candidate sub-band signals.

* * * * *